(12) United States Patent
Tanaglia

(10) Patent No.: US 7,868,095 B2
(45) Date of Patent: Jan. 11, 2011

(54) ADDITIVES FOR LUBRICATING OILS HAVING AN IMPROVED DIMENSIONAL STABILITY AND ENHANCES LOW TEMPERATURE PERFORMANCES, AND PROCESS FOR THE PREPARATION THEREOF

(75) Inventor: Tiziano Tanaglia, Bologna (IT)

(73) Assignee: Polimeri Europa S.p.A., Brindisi (IT)

( * ) Notice: Subject to any disclaimer, the term of this patent is extended or adjusted under 35 U.S.C. 154(b) by 593 days.

(21) Appl. No.: 11/294,569

(22) Filed: Dec. 6, 2005

(65) Prior Publication Data

US 2006/0135697 A1 Jun. 22, 2006

(30) Foreign Application Priority Data

Dec. 16, 2004 (IT) .......................... MI2004A2399

(51) Int. Cl.
*C08L 9/00* (2006.01)
*C08L 23/04* (2006.01)
*C08L 23/10* (2006.01)

(52) U.S. Cl. ...................................... 525/232; 525/240
(58) Field of Classification Search ................ 525/232, 525/240
See application file for complete search history.

(56) References Cited

U.S. PATENT DOCUMENTS

| RE30,405 | E | * | 9/1980 | Fischer ........................ 525/240 |
| 5,525,672 | A | * | 6/1996 | Jones .......................... 525/80 |
| 5,578,682 | A | | 11/1996 | White |
| 5,837,773 | A | | 11/1998 | Olivier et al. |
| 6,211,332 | B1 | | 4/2001 | Tanaglia |
| 7,553,802 | B2 | * | 6/2009 | Tanaglia ...................... 508/591 |

FOREIGN PATENT DOCUMENTS

| EP | 0 637 611 A2 | 2/1995 |
| EP | 1 013 673 A1 | 6/2000 |
| GB | 1001455 | 8/1965 |

OTHER PUBLICATIONS

U.S. Appl. No. 11/203,065, filed Aug. 15, 2005, Tanaglia.
U.S. Appl. No. 12/162,703, filed Jul. 30, 2008, Tanaglia.
P. R. Dluzneski, Rubber World, "The Chemistry of peroxide vulcanization", Rubber World, Aug. 1, 2001, pp. 1-6.

* cited by examiner

*Primary Examiner*—Nathan M Nutter
(74) *Attorney, Agent, or Firm*—Oblon, Spivak, McClelland, Maier & Neustadt, L.L.P.

(57) ABSTRACT

A process is described for obtaining viscosity index improver compounds (V.I.I.) having an improved dimensional stability and capable of enhancing the low temperature rheology of lubricating oils, the above process comprising the treatment of amorphous EP(D)M copolymers or terpolymers, optionally mixed with semi-crystalline EP(D)M, mixed with linear polyethylenes, the treatment being effected in the presence of one or more substances of a hydroperoxide nature and optionally in the presence of small quantities of polyfunctional vinyl monomers, the above treatment being carried out under high shear conditions at a temperature ranging from 75° C. to 260° C., preferably from 140° C. to 210° C.

12 Claims, No Drawings

ADDITIVES FOR LUBRICATING OILS HAVING AN IMPROVED DIMENSIONAL STABILITY AND ENHANCES LOW TEMPERATURE PERFORMANCES, AND PROCESS FOR THE PREPARATION THEREOF

The present invention relates to additives for lubricating oils having an improved dimensional stability and enhanced low temperature performances, and the process for their preparation by the degradation of ethylene/propylene copolymers or terpolymers.

More specifically, the present invention relates to a process for obtaining ethylene/propylene copolymers and terpolymers, characterized by a low molecular weight and obtained by the degradation, in an extruder, of higher molecular weight polymers.

The method of the present invention allows ethylene copolymers and terpolymers to be extruded with propylene (hereafter indicated as EP(D)M), obtaining products with a reduced molecular weight, which can be used in the field of lubricating oil additives. The additives, object of the present invention, completely amorphous or consisting of blends of amorphous and crystalline EP(D)M, are characterized by an improved dimensional stability allowing an improved recovery of the product using the normal equipment adopted in the field of plastic materials, and enhanced low temperature properties.

Elastomeric copolymers and terpolymers of ethylene are widely used in the field of additives for lubricating oils (in the field indicated with the term OCP, olefin copolymer), and their characteristics have been widely studied.

In selecting the product to be used in the field, aspects linked to the molecular weight, molecular weight distribution and ethylene content of the additive, are of great importance.

An increase in the molecular weight of the polymer is accompanied by the tendency of an increase in the thickening capacity of the additive, or the capacity of increasing the viscosity at a high temperature of the oil base.

To ensure that the chains are stable under the high shear conditions of the lubricating parts of the engine, however, generally low molecular weights are preferred, which are difficult to obtain in polymerization plants.

For this reason, it may be preferable to modify, downstream, the molecular weight of the polymer obtained under standard conditions in the polymerization plant, and subsequently degrade it.

As far as the composition of the OCP additive is concerned, high bound ethylene produces better high temperature rheological properties (thickening); as these additives are partially crystalline, however, they tend to form overstructures at low temperatures which depress the properties of the oil upon the low temperature ignition of the engine, such as its pumpability.

The properties, however, cannot be balanced by intermediate ethylene compositions as these compositions have ethylene sequences (average) capable of interfering with the pour point depressant additives of the oil, jeopardizing its activity and causing a further deterioration in the low temperature rheology of the lubricating oil.

It is consequently common practice in the field to use semi-crystalline products mixed with amorphous products for balancing their properties (for example U.S. Pat. No. 4,507,515 and U.S. Pat. No. 3,697,429); completely amorphous products are used more frequently.

Degradation techniques in a batch masticator are known, wherein the polymeric bases undergo batch oxidative treatment. The process does not provide an optimum productivity, however, and the polymer is also subsequently dissolved in oil and transported in a concentrated solution with a consequent increase in the logistic costs.

Other processes, well-known to experts in the field, are based on the shear degradation of standard polymers in solution. Also in this case, however, the productivities and logistic costs are jeopardizing.

In short, the process which, at least from a theoretical point of view, allows a more advantageous reduction in the molecular weight of standard EP(D)M for obtaining solid OCP is the extrusion process mentioned for example in patent CA-A-911,792.

This document however does not mention technological solutions capable of allowing the recovery of the product when this is amorphous.

If used in the treatment of high-ethylene semi-crystalline products or mixtures with a preponderant semi-crystalline base, the process of CA-A-911,792 can in fact be and is widely used; in the case of amorphous products, however, the recovery of a product having a low dimensional stability becomes extremely critical above all in relation to the low final molecular weight.

This critical aspect becomes even more apparent considering the fact that degradation processes in extrusion can be carried out in non-dedicated plants, by modifying and adapting the screw and thermal profiles: under these conditions the economical running of the process becomes even more advantageous and flexible provided the material recovery systems used in the normal extrusion lines for polymeric materials can also process the degraded product, and this certainly does not occur if the end-product is amorphous or preponderantly amorphous.

For this reason, degraded amorphous products with molecular weights which can be used in sector VII, are characterized by finishing treatment which provides for the direct dissolution of the polymer in oil (as described in U.S. Pat. No. 4,464,493). Under these conditions, however, part of the advantages of the process itself are lost, as it is consequently necessary to move large volumes of liquid rather than smaller volumes of solid polymer and plants of this type are obviously exclusively dedicated to these processings.

It is possible to obtain low molecular weight and amorphous products in polymerization. In this case, as the products thus obtained have the same problems specified above, they tend to create problems in the various product recovery phases (stripper extrusion etc.). These productions are normally characterized by a low productivity and frequent running stoppages.

Experts in the field are also aware that by mixing EP(D)M with crystalline polyolefins (polypropylene and polyethylene), products are obtained with an improved dimensional stability: it is also known however that these products are not compatible with application VII, as they have a low solubility in mineral oil and induce turbidity and gelation on the end-formulate and on the concentrated solutions of OPC used as intermediate product.

Italian patent application MI98A 002774, of the same writer, claims the use of products of a hydroperoxide nature for reducing the molecular weight of ethylene-propylene copolymers and obtaining polymers which are difficult to produce in industrial polymerization plants. Also in this case, the recovery of amorphous or preponderantly amorphous OCP is critical, even if it is known that, as a result of a light branching induced on the polymer, there is, in any case, a slight improvement in the dimensional stability.

Italian patent application MI2004A 000751, of the same writer, claims, in combination with the use of products of a hydroperoxide nature, the use of polyfunctional monomers capable of regulating the branchings and consequently the rheological properties of the polymer (or mixture of polymers) produced by the process.

In the experimental examples provided on polymeric blends both as examples of the invention and as comparisons, it is shown (again in Italian patent application MI2004A 000751), that the use of hydroperoxide, with or without the polyfunctional vinyl monomer, produces the chemical bonds between chains coming from one polymeric base and the other.

It has now been found that by feeding, jointly with the EP(D)M polymeric base or EP(D)M blend, small quantities of copolymers or homopolymers of ethylene belonging to the group of linear polyethylenes, to the degradation process in an extruder, and in the presence of hydroperoxide, an OCP additive is obtained, characterized by an improved dimensional stability, with no problems of turbidity and gelation and with enhanced low temperature anti-gelling properties.

In this way, it is possible to process amorphous OCP using normal finishing machines for plastic materials and recover the product, improve the dimensional stability and consequently the handling of the product obtained by the degradation of amorphous and crystalline EP(D)M blends.

The process of the present invention also allows an unexpected improvement in the low temperature properties of the final lubricating oil to be obtained.

In accordance with this, the present invention relates to a process for obtaining viscosity index improver (V.I.I.) compounds having an enhanced dimensional stability and capable of improving the low temperature rheology of the lubricating oil, the above process comprising the treatment of amorphous EP(D)M copolymers or terpolymers, optionally mixed with semi-crystalline EP(D)M, mixed with linear polyethylenes, the treatment being effected in the presence of one or more substances of a hydroperoxide nature and optionally in the presence of small quantities of polyfunctional vinyl monomers, the above treatment being carried out under high shear conditions at a temperature ranging from 75° C. and 260° C., preferably from 140° C. to 210° C.

The component indicated as linear polyethylene is a homopolymer or copolymer of ethylene characterized by a crystalline structure and a density ranging from 0.88 to 0.94, preferably from 0.89 to 0.91.

The polyethylenes which can be adopted according to the present invention are typically indicated with the abbreviations HDPE, LLDPE, VLDPE, ULDPE-LLDPE, VLDPE and ULDPE being preferred. These products show an improved adaptability to the process, object of the present invention, if they have a medium-high fluidity (MFI (E) greater than 5), higher molecular weight products, however, can also be used. The products indicated in the known art as plastomers and also EVA products can also be adopted, provided they respect the characteristics indicated above.

The ethylene-propylene copolymer or ethylenepropylene-non-conjugated diene terpolymer which is used as an amorphous base according to the present invention, is characterized by an ethylene content ranging from 62 to 35% by weight, preferably from 55 to 45%. The third monomer from 0 to 10% by weight, preferably from 0 to 3% by weight, even more preferably 0.

The molecular weight of the EP(D)M used as amorphous base is not a critical aspect of the process. It is naturally preferable however to have a weight average molecular weight higher than 150,000 to avoid problems in the feeding to the extruder; exceeding a molecular weight of 250,000, on the other hand, is not advisable, to avoid excessive energy consumption and reaching the maximum couple allowed for the extruder engine.

As far as the EP(D)M used as a semi-crystalline base is concerned, this is characterized by an ethylene content ranging from 80 to 64% by weight, preferably from 75 to 68% by weight. The third monomer ranges from 0 to 10%, preferably from 0 to 3, and is even more preferably 0.

The molecular weight of the semi-crystalline base is not a critical aspect of the process; it is preferable however to have a molecular weight lower than that of the amorphous base.

The ratio between the EP(D)M and the ethylene homopolymer or copolymer belonging to the group of polyethylenes or plastomers ranges from 97:3 to 85:15, it is preferable however to maintain the ratio within the range of 96:4 to 90:10.

The process, object of the present invention provides a degraded polymer having a weight average molecular weight ranging from 50,000 to 140,000, preferably from 70,000 to 125,000.

The product, object of the present invention, is characterized by an improved dimensional stability guaranteed by the presence of polyethylene branchings on amorphous chains and vice versa. This type of structure also ensures an unexpected enhanced low temperature performance of the product, demonstrated by the pour point tests. In this case, in fact, the presence of the polyethylene chains assists the application whereas, as is known to experts in the field, the presence of polyethylene normally produces counter-indications such as the presence of precipitations or gelations at low temperatures and a high turbidity at room temperature, not observed in the products, object of the invention.

The degradation process of the present invention is carried out in the presence of a substance of a hydroperoxide nature under high shear conditions.

The process of the present invention is characterized by being carried out preferably in extrusion, under high shear conditions.

The types of preferred extruders are those which guarantee a sufficient mastication, or typically twin-screw extruders or extruders of the ko-kneter type.

The extrusion plant is generally composed of a feeding zone in which gravimetric or volumetric hoppers dose the various components and send them to the extruder inlet.

The extruder, single-screw, twin-screw (co- or counter-rotating), ko-kneter, heats and sends the granules of the products fed towards a mixing area, the combined effect of the temperature, mixing and compression on the product leads to the plasticization of the various polymeric bases and, by continuing and/or intensifying the process, to close mixing and degradation.

The high shear conditions of the process of the present invention can be represented by the shear rate which is preferably higher than 100 sec$^{-1}$, more preferably higher than 500 sec$^{-1}$.

Optionally and preferably, as indicated in Italian patent application MI2004A 000751 by the same writer, the entity of the branching is regulated through the dosage of a polyfunctional vinyl monomer.

The substance of a hydroperoxide nature is characterized by not having a significant thermal decomposition under the process conditions, this concept being expressed as halving time higher than the total process time, preferably 10 times higher than the process time.

The quantity of hydroperoxide to be fed ranges from 0.05 to 5% by weight, preferably from 0.15 to 1.5% by weight.

The polyfunctional vinyl monomer is preferably bifunctional and is used in a concentration ranging from 0 to 2%, preferably from 0 to 0.75%, more preferably from 0 to 0.5%.

In an optional embodiment of the present invention, the process is carried out by feeding small quantities of styrene-hydrogenated diolefin block copolymer. This is for further improving the dimensional stability of the end-product and also because, if this material is ground, it can be used as an anti-packing agent of the amorphous product in the feed and as carrier of the process additives.

Typically obtained by step anionic catalysis, these polymers are known to experts in the field as SEBS, SPC wherein the soft part consists of hydrogenated polybutadiene, hydrogenated polyisoprene or isoprene-hydrogenated butadiene copolymer.

The hard part, on the other hand, consists of fragments of polystyrene chain.

The hydrogenated block copolymer which can be optionally used according to the present invention, has a styrene content ranging from 15 to 50%. The same product would therefore have from 85 to 50% of hydrogenated conjugated diolefinic units, as these units consist of butadiene or isoprene or butadiene-isoprene copolymer—in the case of butadiene, at least 20% with 1, 2 co-chaining.

Said optional component is characterized by a molecular weight ranging from 45,000-250,000, preferably from 50,000 to 200,000.

If the component indicated as hydrogenated block copolymer is adopted, it should be used in a maximum concentration of 10%.

If hydrogenated block copolymers are used, the total process time should not exceed 150 seconds, preferably 90 seconds. The block copolymer can also be inserted either directly in the production of EP(D)M polymeric bases as process additive, or fed during the process in a phase subsequent to the feeding of the EP(D)M.

In a further optional embodiment of the present invention, the post-modification process in continuous is carried out within the finishing phase of the production process of the generator polymeric base. In this case, all or, preferably, a part of the polymer in finishing phase (before the final forming) is removed from the standard flow and sent to the transformation machine selected for the process, object of the invention.

The following examples are provided for a better understanding of the present invention.

EXPERIMENTAL EXAMPLES

Material

Dutral® CO058 ethylene-propylene copolymer, Polimeri Europa.
48% wt of propylene
ML (1+4) at 100° C.=78
MFI (L)=0.6
Clearflex® MQF0 VLDPE, Polimeri Europa
Density=0.895
MFI (E)=13
Melting point 110° C. (DSC)
The t-butyl hydroperoxide (TBHP) used was supplied by Akzo Nobel Chem. At 70% in aqueous solution (tradename Trigonox AW70)
Saret® 231-Sartomer (diethylene glycol dimethacrylate)
Phenolic antioxidant Anox® PP18 (Great Lakes).

Example 1

Ref. 11

The following polymeric base was fed to a twin-screw extruder of the type Maris TM 35V, L/D=32

Maximum temperature 210° C.

RPM=260:
  100 phr CO058
  5.3 phr Clearflex® MQF0
  0.79 phr TBHP
  0.2 phr Saret® 231
  A product was recovered, subsequently homogenized in a calender.

The Mooney and Mooney relaxation viscosity analysis was effected on this product at 100° C. according to the regulation ASTM D1646-03.

ML (1+4) at 100° C.=15.7

Slope=0.7996

Area=34.8

A/ML=2.2

Example 2

Ref. 16

The following polymeric base was fed to a twin-screw extruder of the type Maris TM 35V, L/D=32

Maximum temperature 205° C.

RPM=260:
  100 phr CO058
  8.7 phr Clearflex® MQF0
  0.79 phr TBHP
  0.13 phr Saret® 231
  A product was recovered, subsequently homogenized in a calender.

The Mooney and Mooney relaxation viscosity analysis was effected on this product at 100° C. according to the regulation ASTM D1646-03.

ML (1+4) at 100° C.=16.3

Slope=0.791

Area=41.0

A/ML=2.5

Example 3

Ref. 20.1

The following polymeric base was fed to a twin-screw extruder of the type Maris TM 35V, L/D=32

Maximum temperature 205° C.

RPM=260:
  100 phr CO058
  13.6 phr Clearflex® MQF0
  0.79 phr TBHP
  0.08 phr Saret® 231
  A product was recovered, subsequently homogenized in a calender.

The Mooney and Mooney relaxation viscosity analysis was effected on this product at 100° C. according to the regulation ASTM D1646-03.

ML (1+4) at 100° C.=12.3

Slope=0.750

Area=30.3

A/ML=2.5

The products of Examples 1, 2 and 3 were dissolved at 1.2% w/w in reference oil SN 150 containing 0.3% of PPD additive for the low temperature tests. All the products were completely dissolved, the product of Example 3 was slightly turbid whereas the products of Example 1 and 2 were perfectly limpid.

The oil base has the following characteristics:

KV 100° C.=5.3 cSt

Fix Point=−36.3° C. (Pour Point=−36° C.).

Indicating as fix point the freezing point determined by means of an automatic temperature scanning instrument, and the pour point as the same datum approximate to three degrees higher

|  | Fix Point ° C. | KV 100° C. in cSt |
| --- | --- | --- |
| Reference oil | −36.3 | 5.3 |
| Sol. 1.2% Example 1 | −38.1 | 12.4 |
| Sol. 1.2% Example 2 | −38.3 | 12.3 |
| Sol. 1.2% Example 3 | −38.6 | 11.7 |

For comparative purposes, and in the same reference oil:

Dutral® CO058 1%: Fix Point=−36.1° C.

Laboratory product obtained by degradation CO058 (ML=12):

Sol. 1.2 Fix Point=35.9° C.

Amorphous commercial product ML (1+4)=8:

Sol. 1% Fix point=−35.7° C.

The Pour Point values obtained using the products object of the invention dissolved in reference oil, are therefore of absolute interest.

It is known, in fact, that the OCP additive can interfere with the PPD additive, reducing the low temperature performances of the oil, above all for products having less than 42% by weight of bound propylene. If completely amorphous OCP additives are used, as the products do not interfere with the additive, they return a pour point (or fix point) in line (slightly worse) wit that of the oil base.

In this case, the presence of polyethylene not only does not lead to anticipated gelation or turbidity of the solution at room temperature, but has actually improved the gelation temperature of the formulate. In perspective, this product can therefore allow preponderantly amorphous polymers to be processed, as, although in small quantities, the presence of polyethylene produces an improved dimensional stability of the additive, but above all enhances the low temperature properties of the polymer allowing:

oils with a high paraffin content to be added;

the incidence of the cost of PPD on the end-formulate to be reduced.

Comparative Example 4

Ref. 35.1

The following polymeric base was fed to a twin-screw extruder of the type Maris TM 35V, L/D=32

Maximum temperature 250° C.

RPM=260:

100 phr CO058

8.7 phr Clearflex® MQF0

A product was recovered, subsequently homogenized in a calender.

The Mooney and Mooney relaxation viscosity analysis was effected on this product at 100° C. according to the regulation ASTM D1646-03.

ML (1+4) at 100° C.=15

Slope=>1

The product thus obtained was dissolved at 1.2% w/w in reference oil SN 150 containing 0.3% of PPD additive for the low temperature tests.

There were dissolution difficulties, in that a much longer time was required and, once the temperature had returned to room value, the product still had a high turbidity (higher than that of Example 3) and the presence of undissolved material. It was obviously not possible to effect any further characterizations.

To allow a better characterization of the structures which allow improvements to be obtained on the performances of the products, object of the present invention, extraction tests were carried out with a solvent mixture on the products of experimental examples 1, 2 and 4c and on a physical mixture CO058+Clearflex® MQF0 95:5.

The tests were carried out with an ether/octane mixture 80:20 obtaining the following results:

TABLE

|  | % PE | Mw/Mn | Mw | Insoluble residue w % | Propylene on residue w % |
| --- | --- | --- | --- | --- | --- |
| Example 1 | 5 | 2.5 | 103000 | 7.4 | 34.1 |
| CO058 + Cleaflex MQF0 | 5 |  |  | 4.95 | 13.9 |
| Example 2 | 8 | 2.4 | 99000 | 7.89 | 29.9 |
| Example 4c Cleaflex MQF0 | 8 | 2.4 | 99000 | 8.30 | 18.4 16.2 |

From an analysis of the data provided in the table, it can be clearly seen how the reference products, a physical mixture with respect to the product of Example 1 and the product of Example 4c with respect to the product 2c, have been recomposed for the most part into starting products through this simple separation method.

Only a small part of the original polyethylene is in fact soluble in the physical mixture and only a minimum part of EPM binds itself to the insoluble part preponderantly consisting of polyethylene in comparative Example 4.

In the case of tests relating to the invention, these show that a preponderant part of polyethylene has bound itself to the soluble part (at least in Example 2 of the invention), whereas a significant amount of EPM has become bound to the polyethylene part becoming insoluble in the ether/octane mixture (not in oil which is definitely a much better solvent). It can therefore be seen that by operating according to what is claimed in the present invention, structures can be obtained which are capable of guaranteeing the following improvements:

improvement in the dimensional stability of the extruded product, so that it can be easily recovered from extrusion and standard post-modification plants;

improvement in the low temperature performances of the product in its use for engine lubricating oils.

The invention claimed is:

1. A process comprising extruding a blend of linear polyethylene and amorphous EP(D)M copolymers or terpolymers, optionally mixed with semi-crystalline EP(D)M, in the presence of at least one hydroperoxide and optionally in the presence of at least one polyfunctional vinyl monomer, wherein the process is carried out at a temperature ranging from 75° C. to 260° C. and at a shear value higher than 100 $\sec^{-1}$, and the processing conditions, including the temperature and shear value, are chosen such that the hydroperoxide does not undergo thermal decomposition, the at least one hydroperoxide has a halving time ten times higher than the process time, and the extruded blend of linear polyethylene and amorphous EP(D)M copolymers or terpolymers is not crosslinked.

2. The process according to claim 1, wherein the temperature ranges from 140° C. to 210° C.

3. The process according to claim 1, wherein the shear value is higher than 500 $\sec^{-1}$.

4. The process according to claim 1, wherein the linear polyethylene is a homopolymer or copolymer of ethylene characterized by a crystalline structure and a density ranging from 0.88 to 0.94.

5. The process according to claim 1, wherein the linear polyethylene has a density ranging from 0.89 to 0.91.

6. The process according to claim 1, wherein the ratio between EP(D)M and ethylene homopolymer or copolymer ranges from 97:3 to 85:15.

7. The process according to claim 6, wherein the ratio between EP(D)M and ethylene homopolymer or copolymer ranges from 96:4 to 90:10.

8. The process according to claim 1, wherein the quantity of hydroperoxide to be fed ranges from 0.05 to 5% by weight.

9. The process according to claim 8, wherein the quantity of hydroperoxide to be fed ranges from 0.15 to 1.5% by weight.

10. The process according to claim 1, wherein the at least one hydroperoxide is t-butyl hydroperoxide.

11. The process according to claim 1, wherein the linear polyethylene is at least one selected from the group consisting of HDPE, LLDPE, VLDPE, and ULDPE.

12. The process according to claim 1, wherein the amorphous EP(D)M copolymers or terpolymers have an ethylene content of 35-62 wt %.

* * * * *